United States Patent [19]

Jeney

[11] Patent Number: 4,874,591

[45] Date of Patent: Oct. 17, 1989

[54] PROCESS FOR THE PURIFICATION OF WASTE GASES CONTAINING HYDROCHLORIC ACID AND SULPHUR DIOXIDE

[75] Inventor: Josef Jeney, Vienna, Austria

[73] Assignee: Maschinenfabrik Andritz Actiengesellschaft, Graz-Andritz, Austria

[21] Appl. No.: 225,380

[22] Filed: Jul. 28, 1988

[30] Foreign Application Priority Data

Jul. 29, 1987 [AT] Austria ................................. 1915/87

[51] Int. Cl.$^4$ ......................... C01B 7/00; C01B 17/00; C01B 7/01
[52] U.S. Cl. .................................... 423/240; 423/242; 423/481
[58] Field of Search ........... 423/240 R, 240 S, 242 A, 423/481

[56] References Cited

U.S. PATENT DOCUMENTS

| 3,481,702 | 12/1969 | Moore et al. | 423/481 |
|---|---|---|---|
| 4,108,959 | 8/1978 | Tatani et al. | 423/242 |
| 4,193,971 | 3/1980 | Kawamata et al. | 423/242 |
| 4,362,709 | 12/1982 | Grohmann et al. | 423/240 |

FOREIGN PATENT DOCUMENTS

| 2308710 | 8/1974 | Fed. Rep. of Germany | 423/481 |
|---|---|---|---|
| 2732580 | 2/1978 | Fed. Rep. of Germany | . |
| 3305120 | 8/1984 | Fed. Rep. of Germany | . |
| 3408705 | 10/1984 | Fed. Rep. of Germany | . |
| 3433759 | 3/1986 | Fed. Rep. of Germany | . |
| 59-120228 | 7/1984 | Japan | 423/240 |
| 1579776 | 11/1980 | United Kingdom | . |

Primary Examiner—Gregory A. Heller
Attorney, Agent, or Firm—Fleit, Jacobson, Cohn, Price, Holman & Stern

[57] ABSTRACT

In a process for the purification of waste gases containing hydrochloric acid and sulphur dioxide obtained from incinerating plant, in particular refuse incinerating plant, hydrochloric acid and gypsum are to be recovered. For that purpose a magnesium hydroxide suspension is used as a regenerable scrubbing agent, resulting in the production of a readily filtrable coarsely particulate calcium sulphate from the sulphate content by precipitation with calcium ions and in hydrochloric acid of 16–30 mass % up to maximum purity by the pyrohydrolysis of the chloride content. The magnesium oxide which is formed is returned to the waste gas scrubber after hydrating.

7 Claims, 1 Drawing Sheet

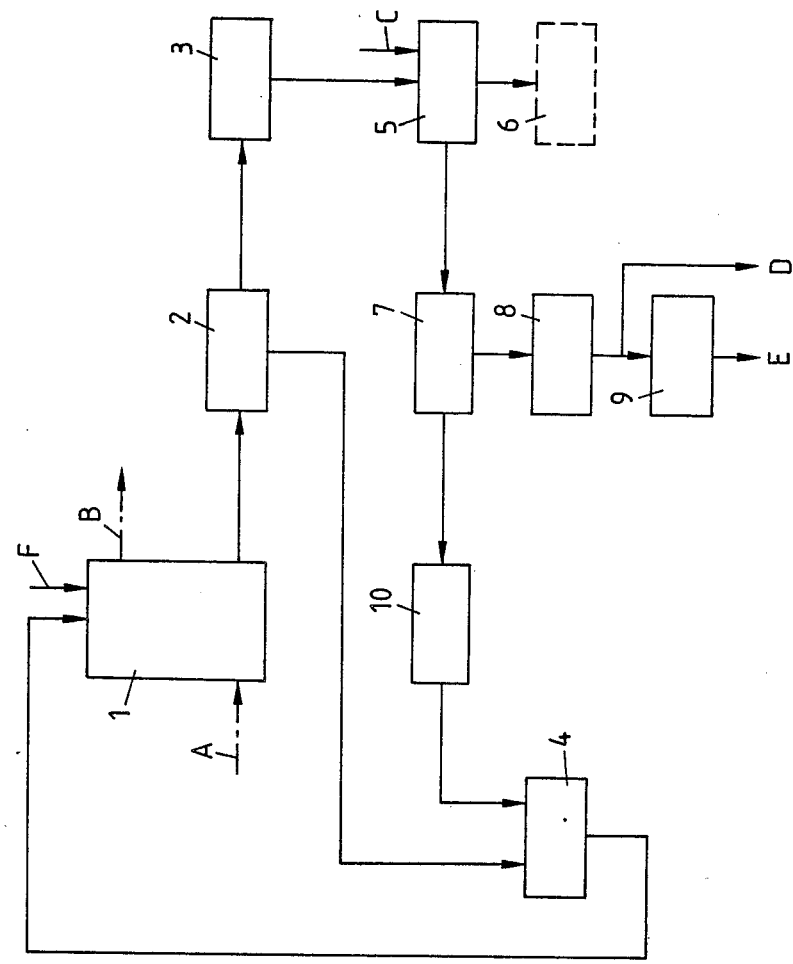

PROCESS FOR THE PURIFICATION OF WASTE GASES CONTAINING HYDROCHLORIC ACID AND SULPHUR DIOXIDE

BACKGROUND OF THE INVENTION AND PRIOR ART

The invention relates to a process for the purification of waste gases containing hydrochloric acid and sulphur dioxide derived from incinerating plant, in particular refuse incinerating plant such as incineration plant for domestic refuse and special refuse, with the use of a scrubbing agent which can be regenerated.

Processes are known for the treatment of combustion waste gases containing $SO_2$ and HCl and have been described for example in the laid-open specification DE-OS 34 33 759, DE-OS 34 08 705, DE-OS 27 32 580 and DE OS 33 05 120. However, in all those processes the HCl washed out of the waste gas must be disposed of in the form of metal chlorides whereby the problem of air pollution is shifted to a waste water problem.

An object of the invention is a provision of a process for purifying the waste gases from incineration plant of the aforesaid type in which hydrochloric acid and gypsum can be recovered, the addition of scrubbing agent being reduced to a minimum. In particular it is intended that the HCl content of the waste gases need not be disposed of in the form of metal chloride, but can be sold as a commercial product of high value.

GENERAL DESCRIPTION OF THE INVENTION

The above object is attained in accordance with the invention in that from the sulfate content, by precipitation with calcium ions a readily filtrable coarsely particulate calcium sulphate is produced and that from the chloride content, by pyrohydrolysis a hydrochloric acid is obtained containing 16 to 30% by mass and up to maximum purity.

A further feature of the process according to the invention resides in that a magnesium hydroxide suspension is used as a regenerable scrubbing agent for the absorbed hydrochloric acid and the absorbed sulphur dioxide.

BRIEF DESCRIPTION OF THE DRAWING

The process according to the invention will be explained in what follows with reference to the drawing which represents a block diagram.

DETAILED DESCRIPTION OF EMBODIMENTS OF THE INVENTION

The waste gas derived from a refuse incineration plant is passed into a waste gas scrubber 1 at A and is discharged at B and is contacted in the scrubber with an aqueous suspension of magnesium hydroxide. Thus the major part of the $Mg(OH)_2$ is converted into $MgCl_2$ and $MgSO_4$. The oxidation of sulphite to sulphate proceeds in known manners. The spent scrubbing liquor is subsequently passed into a first thickener 2, from the overflow of which $MgCl_2$ and $MgSO_4$ are withdrawn and passed to a vacuum evaporator 3, whilst $Mg(OH)_2$ is derived from its lower region and is passed to a second thickener 4. The evaporation concentrated $MgCl_2$ and $MgSO_4$ is passed to an agitating vessel 5, whilst by way of C solid $CaCl_2$ or a $CaCl_2$ solution of preferably 40 mass % or more is fed, whereby $CaSO_4.xH_2O$ is formed in coarsely particulate readily filtrable form which is passed to a disposal station 6. The $MgCl_2$ portion, jointly with the $MgCl_2$ formed, and the $CaSO_4$ and the $CaCl_2$ which are formed are passed to a spray roasting apparatus 7 in which by pyrohydrolysis the $MgCl_2$ brine is converted into MgO and HCl. The HCl is absorbed in an adiabatic absorption column 8 in the form of hydrochloric acid of 15 to 18 mass % and is available at B as a saleable product, or it is subjected to further concentration to 30 mass % with a simultaneous purification in a concentrator 9 and made available for sale at E.

The MgO is discharged from the spray roaster 7 and is mixed in a hydrating vessel 10 with water and mostly hydrated to $Mg(OH)_2$. The hydrated MgO is passed to the second thickener 4 and is returned to the scrubber 1 after appropriate dilution jointly with the $Mg(OH)_2$ derived from the first thickener 2, the scrubber being adapted to be fed with a metered supply of $Mg(OH)_2$ by way of F for starting up and regeneration purposes, such that the required amount of $Mg(OH)_2$ is always available in the scrubber 1.

In the followingthree examples of the process according to the invention will be described.

EXAMPLE 1

500 000 $Nm^3/h$ of waste gas having an HCl content of 5000 $mg/Nm^3$ 3(2500 kg/h) and an $SO_2$ content of 150 $mg/Nm^3$ (75 kg/h) are passed to the waste gas scrubber 1. 3265 kg/h of $MgCl_2$, 141 kg/h of $MgSO_4$ and 130 kg/h of $Mg(OH)_2$ are passed from the waste gas scrubber 1 to the first thickener 2, which corresponds to a volume throughput of 16 $m^3/h$. The same amount of $MgCl_2$ and $MgSO_4$ is passed to the vacuum evaporator, and the same amount of $Mg(OH)_2$ is passed to the second thickener. In the vacuum evaporator the volume throughput is reduced from 16 $m^3/h$ to 9 $m^3/h$, whilst the $MgCl_2$ concentration is increased from 300 to 400 g/l. 143 kg/h of $CaCl_2$ are passed into the agitator vessel 5 in order to precipitate $CaSO_4$ such that 165 kg/h of $CaSO_4.xH_2O$, 3376 kg/h of $MgCl_2$, 14 kg/h of $CaSO_4$ and 13 kg/h of $CaCl_2$ are obtained, whilst $MgCl_2$, $CaSO_4$ and $CaCl_2$ are fed at a volume throughput rate of 9 $m^3/h$ to the spray roaster 7. 14367 kg/h of hydrochloric acid of 18 mass % and 1428 kg/h of MgO are obtained from the spray roaster 7 after the absorption column 8. From the concentrator 9, 8620 kg/h of hydrochloric acid of 30 mass % are obtained. The amount of MgO passed to the hydrating vessel 10 is 1428 kg/h, from which is obtained 2070 kg/h of $Mg(OH)_2$ and is passed to the second thickener 4 so that altogether 2200 kg/h of $Mg(OH)_2$ are withdrawn therefrom and can be fed to the scrubber 1 at a volumetric throughput rate of 16 $m^3/h$.

EXAMPLE 2

100 000 $Nm^3/h$ of waste gas having an HCl content of 10 000 $mg/Nm^3$ (1000 kg/h and an $SO_2$ content of 300 $mg/Nm^3$ (30 kg/h) are fed into a waste gas scrubber 1. 1306 kg/h of $MgCl_2$, 27 kg/h of $MgSO_4$ and 86 kg/h of $Mg(OH)_2$ are passed from the waste gas scrubber 1 to the first thickener 1, corresponding to a volumetric throughput of 6,5 $m^3/h$. The vacuum evaporator is supplied with the same amount of $MgCl_2$ and $MgSO_4$, and the second thickener is supplied with the same amount of $Mg(OH)_2$. In the vacuum evaporator the volumetric throughput is reduced from 6,4 $m^3/h$ to 3,5 $m^3/h$, whilst the $MgCl_2$ concentration is increased from 300 to 400 g/l. In order to precipitate $CaSO_4$ in the agitator vessel 5, the latter is supplied with 28 kg/h of CaCl$_2$ such that 28 kg/h of CaSO$_4$.x H$_2$, 1327 kg/h of MgCl$_2$, 5,5 kg/h of CaSO$_4$ and 3 kg/h of CaCl$_2$ are obtained whilst MgCl$_2$, CaSO$_4$ and CaCl$_2$ are fed to the spray roaster 7 at a volumetric throughput rate of 3,5 m$^3$/h. 5650 kg/h of hydrochloric acid of 18 mass % and 560 kg/h of MgO are obtained from the spray roaster 7 after the absorption column 8. 3390 kg/h hydrochloric acid of 30 mass % are obtained from the concentrator 9. The amount of MgO fed to the hydrating vessel 10 is 560 kg/h from which 814 kg/h of Mg(OH)$_2$ are obtained and are passed to the second thickener 4 such that altogether 900 kg/h of Mg(OH)$_2$ are withdrawn and can be passed to the scrubber 1 at a volumetric throughput rate of 6,5 m$^3$/h.

EXAMPLE 3

700 000 Nm$^3$/h of waste gas having an HCl content of 200 mg/Nm$^3$ (1400 kg/h) and an SO$_2$ content of 500 mg/Nm$^3$ (350 kg/h) are passed to the waste gas scrubber 1. 1828 kg/h of MgCl$_2$, 658 kg/h of MgSO$_4$ and 1200 kg/h of Mg(OH)$_2$ pass from the waste gas scrubber 1 to the first thickener 2, which corresponds to a volumetric throughput of 11 m$^3$/g. The same amount of MgCl$_2$ and MgSO$_4$ is passed to the vacuum evaporator and the same amount of Mg(OH)$_2$ is passed to the second thickener. In the vacuum evaporator the volumetric throughput is reduced from 11 m$^3$/h to 6,5 m$^3$/h, the MgCl$_2$ concentration being increased from 300 to 400 g/h. 620 kg/h of CaCl$_2$ are passed to the agitator vessel 5 for CaSO$_4$ precipitation, so that 831 kg/h of CaSO$_4$.x H$_2$O, 2349 kg/h of MgCl$_2$, 10 kg/h of CaSO$_4$ and 13 kg/h of CaCl$_2$ are obtained, whilst MgCl$_2$ and CaSO$_4$ and CaCl$_2$ are fed to the spray roaster 7 at a volumetric throughput rate of 6,5 m$^3$/h. 10000 kg/h of hydrochloric acid of 18 mass % and 995 kg/h of MgO are obtained from the spray roaster 7 after the absorption column 8. From the concentrator 9 6000 kg/h hydrochloric acid of 30 mass % are obtained. The amount of MgO passed to the hydrating vessel 10 is 995 kg/h wherefrom 1440 kg/h of Mg(OH)$_2$ are obtained and passed to the second thickener 4 such that altogether 1560 kg/h of Mg(OH)$_2$ are withdrawn and can be passed to the scrubber 1 at a volumetric thoughput rate of 11 m$^3$/h.

The claims which follow are to be considered part of the present disclosure.

What we claim is:

1. A process for the purification of a waste gas containing hydrochloric acid and sulphur dioxide comprising the steps of:
   contacting a waste gas containing hydrochoric acid and sulphur dioxide with a magnesium-containing scrubbing agent to produce reaction products, said magnesium-containing scrubbing agent being free of gypsum;
   adding a calcium-containing reagent to said reaction products to produce a chloride-containing liquid and a precipitate of particulate calcium sulphate; and then
   subjecting said chloride-containing liquid to pyrohydrolysis to produce hydrochloric acid of 16 to 30 mass % and to regenerate said magnesium-containing scrubbing agent.

2. A process according to claim 1, further comprising the step of concentrating the hydrochloric acid up to a maximum of dry hydrochloric acid gas.

3. A process according to claim 1, wherein the hydrochloric acid is recovered at up to maximum purity.

4. A process according to claim 1, wherein the magnesium-containing scrubbing agent is an aqueous magnesium hydroxide suspension.

5. A process according to claim 4, wherein magnesium hydroxide is the only magnesium-containing scrubbing agent.

6. A process according to claim 1, wherein the calcium-containing reagent is calcium chloride.

7. A process for the purification of a waste gas containing hydrochloric acid and sulfur dioxide comprising the steps of:
   contacting a waste gas containing hydrochloric acid and sulfur dioxide with an aqueous suspension of a scrubbing agent to produce a first mixture, said scrubbing agent consisting essentially of magnesium hydroxide;
   separating said first mixture into magnesium hydroxide-containing portion and a reaction products-containing portion;
   adding a calcium-containnng reagent to said reaction products-containing portion to produce a precipitate of calcium sulphate and a chloride-containing liquid;
   subjecting said chloride-containing liquid to pyrohydrolysis to produce hydrochloric acid and magnesium oxide; and then
   hydrating the magnesium oxide to regenerate magnesium hydroxide.

* * * * *